United States Patent [19]

Patel et al.

[11] Patent Number: 4,881,001
[45] Date of Patent: Nov. 14, 1989

[54] STATOR LAMINATE RETAINER ASSEMBLY

[75] Inventors: Navinchandra R. Patel; Robert A. Schwarz, both of Rockford, Ill.

[73] Assignee: Sundstrand Corporation, Rockford, Ill.

[21] Appl. No.: 251,966

[22] Filed: Sep. 28, 1988

Related U.S. Application Data

[63] Continuation of Ser. No. 161,226, Feb. 17, 1988, abandoned, which is a continuation of Ser. No. 46,843, May 5, 1987, abandoned.

[51] Int. Cl.[4] .......................... H02K 1/18; H02K 5/00; H02K 5/04
[52] U.S. Cl. ...................................... 310/258; 310/89; 310/217
[58] Field of Search ............... 310/216, 217, 218, 254, 310/258, 259, 89, 91; 29/596

[56] References Cited

U.S. PATENT DOCUMENTS

| 4,076,989 | 2/1978 | Watson | 310/258 |
| 4,250,423 | 2/1981 | Linscott, Jr. | 310/258 |
| 4,341,968 | 7/1982 | Borden et al. | 310/258 |
| 4,652,782 | 3/1987 | Rossie | 310/217 |

Primary Examiner—Patrick R. Salce
Assistant Examiner—D. L. Rebsch
Attorney, Agent, or Firm—Wood, Dalton, Phillips, Mason & Rowe

[57] ABSTRACT

In a dynamoelectric machine, a stator assembly is mounted directly in a bore of a housing for surrounding a rotor. The bore has an axially extending slot. The stator assembly includes a plurality of laminations bonded together in a stacked array for circumferentially surrounding the rotor. A given number of the laminations at one end of the stator assembly are radially enlarged to define a tab-like flange for projecting into the slot of the housing to prevent the stator assembly from rotating relative to the housing. Complementary axially abutting shoulders are provided between the stator assembly and the housing to prevent relative rotation therebetween.

3 Claims, 3 Drawing Sheets

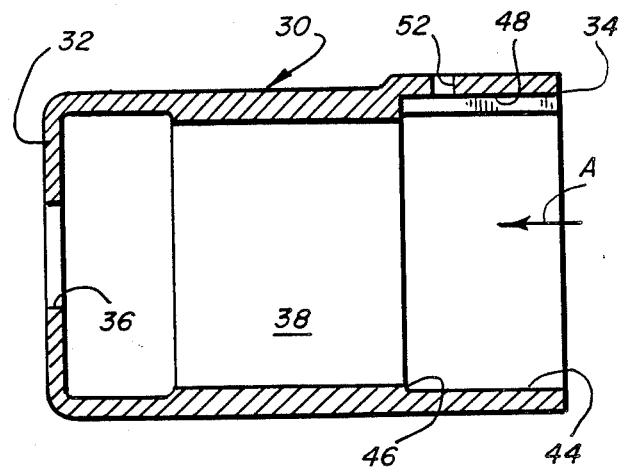
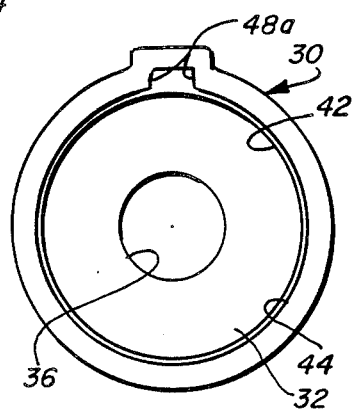
FIG. 7    FIG. 8
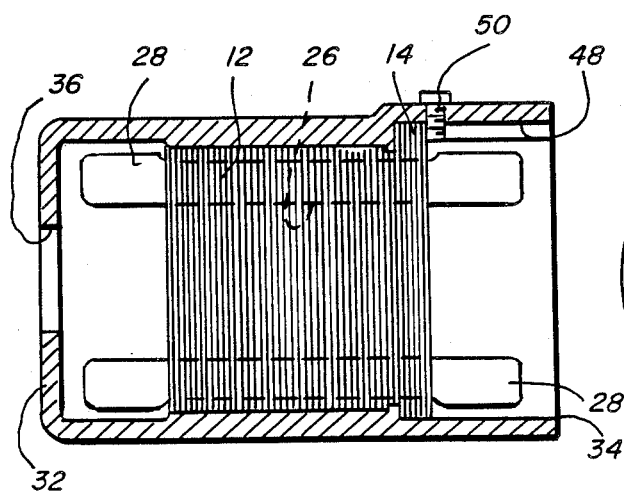
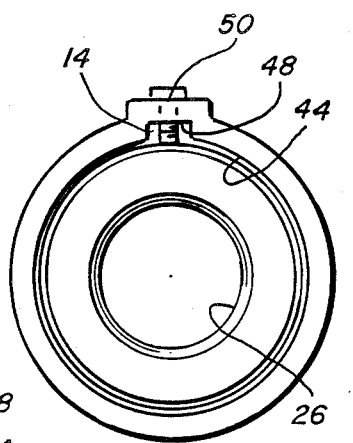
FIG. 9    FIG. 10

STATOR LAMINATE RETAINER ASSEMBLY

This application is a continuation, of application Ser. No. 161,226, filed Feb. 17, 1988 which in turn is a continuation of Ser. No. 046,843 filed May 5, 1987 both now abandoned.

FIELD OF THE INVENTION

This invention generally relates to dynamoelectric machines and, particularly, to a stator assembly for a dynamoelectric machine.

BACKGROUND OF THE INVENTION

Certain types of electric motors are manufactured or assembled by forming a stator of a series o f stator plates stacked together to form a laminated body. An example is a permanent magnet brushless DC motor. In some instances, the laminations are permanently bonded to one another to form a rigid, solid body or core. In other instances, the laminations are assembled in a loose array for subsequent repositioning. In either instance, the motor field windings then are installed, usually in axially extending slots in the wall of a bore through the stator. This stator then is attached to a frame or installed within a housing of the motor with the bore through the stator receiving a rotor attached to a shaft journalled in the frame or associated housing. Preferably, the stator bore walls and the rotor are concentrictor provide a uniform air gap between the parts; otherwise the motor will be inefficient and have unacceptable operating characteristics.

It is important that a DC brushless motor in actuator applications provides equal performance in both directions (same current, input power and speed), and this is achieved by locking the stator assembly into a tined position which prevents the stator assembly from moving axially or radially. One or two degrees of radial movement of the stator assembly relative to the housing after the commutator resolver is aligned, will cause as much as a ten percent increase in motor current and input power, along with a decrease in motor speed, resulting in an equal impact on the system's critical performance.

Heretofore, rather complex, costly and heavy locking fixtures, brackets or the like have been used to lock the motor stator assembly. To reduce such factors, locking pins or the like have been bored directly into the laminated body of the stator assembly, which is an undesirable approach.

This invention is directed to solving the above problems by providing a nique mount for a stator assembly, such as in a permanent magnet brushless DC motor.

SUMMARY OF THE INVENTION

An object, therefore, of the invention is to provide a new and improved dynamoelectric machine with a unique system for mounting the motor stator.

In the exemplary embodiment of the invention, a housing is provided with a generally cylindrical bore. Shoulder means are formed within the housing about the bore. A slot extends axially in the bore, the slot being deeper than the shoulder means. A stator assembly is positioned within the bore of the housing and prevented from relative axial and radial movement by the shoulder means and the slot.

Specifically, the stator assembly includes a plurality of generally circular laminations bonded together in a generally cylindrical stacked array. A given number of the laminations at one end of the stator assembly are enlarged in diameter, to define complementary shoulder means for abutting the shoulder means of the housing. This prevents axial movement of the stator assembly in one axial direction relative to the housing. Axial retaining means are readily positionable through the housing for engaging the stator assembly in an axial direction opposite the one direction, to prevent axial movement of the stator assembly relative to the housing. The enlarged laminations are further enlarged in diameter over less than 360° in circumference to define a radially outwardly projecting tab-like flange for positioning in the slot of the housing. This prevents rotation of the stator assembly relative to the housing.

It can be seen from the above, that axial and radial confinement of the stator assembly relative to the housing is achieved solely by the configuration of the laminations and the bore through the housing, thereby obviating the need of any extraneous mounting fixtures, brackets or the like or any penetration of the laminated stator core, except for the axial retaining means which may comprise a simple pin or set screw which does not penetrate the stator core.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, ay be best understood by reference to the following description taken in conjunction with the accompanying drawings, in which like reference numerals identify like elements in the figures and in which:

FIG. 7 is an axial section through a housing for the stator assembly of the invention;

FIG. 8 is an end elevational view looking at the right-hand end of FIG. 7;

FIG. 9 is a view similar to that of FIG. 7, with the stator assembly of FIG. 6 positioned and retained within the housing; and FIG. 10 is an end elevational view looking at the right-hand end of FIG. 9.

DETAILED DESCRIPTION OF THE PREFERRED EMBODIMENT

Figure 1:
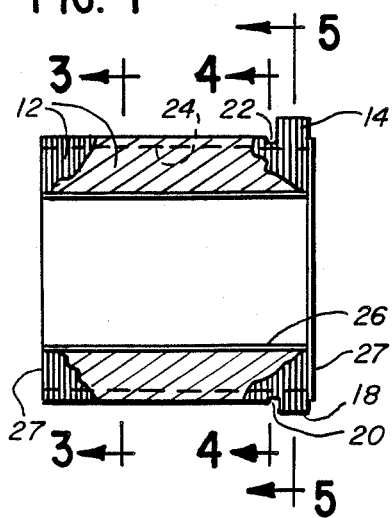
FIG. 1 is a fragmented axial section through a laminated stator core, embodying the concepts of the invention.

The invention is illustrated herein in a combination of a housing and a stator assembly for use in a dynamoelectric machine, such as a brushless DC motor appropriate for actuator applications. Generally, in the drawings, FIGS. 1-5 show the laminated core construction of the stator assembly. FIG. 6 shows the laminated core assembled with the motor field windings. FIGS. 7 and 8 show the complementary housing for the stator assembly. FIGS. 9 and 10 show the stator assembly in locked or retained position within the housing, providing a combination for use with a rotor in the dynamoelectric machine.

Figure 2:
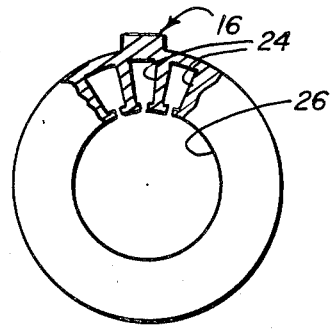
FIG. 2 is an end elevational view of the stator core looking to the right-hand end of FIG. 1.

Referring to the drawings in greater detail, and first to FIGS. 1-5, the stator assembly includes a laminated body or core, generally designated 10, which includes a plurality of generally circular laminations 12 bonded together in a generally cylindrical stacked array. A given number of laminations 14 at one end of the stacked array are enlarged in diameter over less than 360° in circumference to define a radially outwardly projecting tab-like flange, generally designated 16 (FIG. 2). Actually, laminations 14 are enlarged in diameter, less than that of flange 16, entirely about the core in relation to laminations 12, as best indicated at 18 in FIG. 1. This defines a shoulder means 20 substantially entirely about the core, facing to the left in FIG. 1. in addition, several laminations 22 are reduced in diameter in relation to laminations 12 to provide a relief for machining purposes, as described hereinafter. Axially extending slots 24 (FIG. 2) are formed in a wall of a bore 26 of the core for receiving the motor field windings. Bore 26 is provided for receiving a rotor of the motor concentric with the stator core. Although only three slots 24 are shown in the drawings, the slots will continue about the entire stator core.

Figure 3:
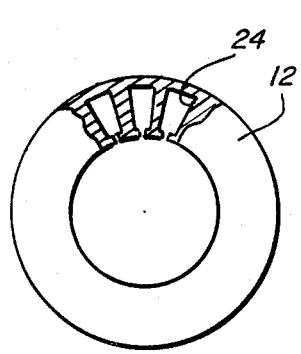
FIG. 3 is a radial section taken generally along line 3—3 of FIG. 1.
Figure 4:
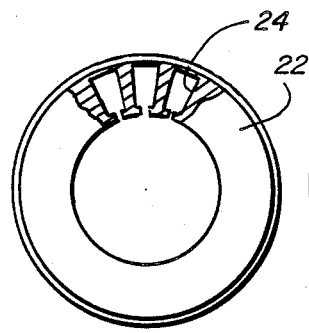
FIG. 4 is a radial section taken generally along line 4—4 of FIG. 1.
Figure 5:
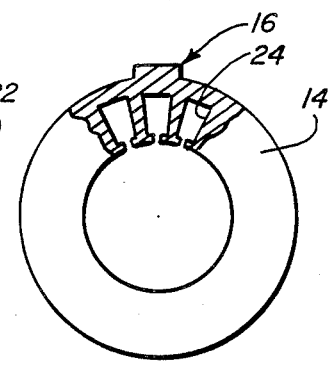
FIG. 5 is a radial section taken generally along line 5—5 of FIG. 1.
Figure 6:
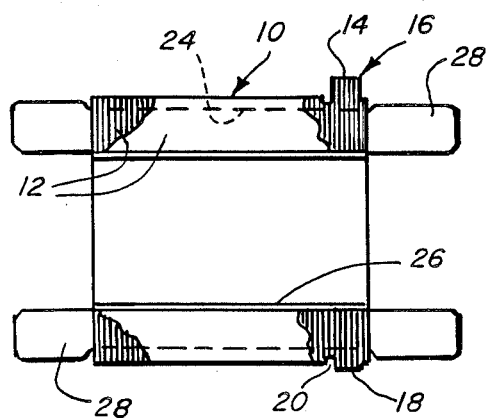
FIG. 6 is a fragmented axial section through a stator assembly incorporating the core of FIG. 1.

FIGS. 3, 4 and 5 simply are sections through FIG. 1 to show that laminations 12 (FIG. 3) which form the major body portion of stator 10 are of a given diameter; laminations 22 (FIG. 4) are of a slightly reduced diameter; and laminations 14 (FIG. 5) are completely enlarged, in diameter, thereabout and further enlarged over a defined angular extent to form tab-like flange 16 Lastly, conventional insulator laminations 27 are provided at each axial and of core 10.

FIG. 6 simply shows stator core 10 with motor field windings 28 in position within slots 24 of the core.

In assembly, laminations 12,22,14 and 27 are stacked in a mixture which has provisions for aligning stator slots 24. The total number of laminations 12,22 and 14, when mounted on the fixture, will provide the stacked length for the total stator magnetic circuit iron. The number of laminations 14 will depend upon the desired thickness of mounting flange 16. An example is the provision of eight laminations 14 of 0.014 inch thick to give a 0.112 inch thick flange. The fixture then is tightened to a specific torque value that is calculated to achieve a compression force based upon the contact area between adjacent laminations. The entire assembly then is placed in an oven and baked at a temperature high enough to melt an epoxy coating which has been provided on the laminations. The coating resolidifies upon cooling, thus forming a bond between the lamination surfaces.

After the bonded stator stack assembly is removed from the stacking fixture, the outside diameters are machined. Since stator assembly 10 of this invention is contained within a housing, as described hereinafter, laminations 12 are machined to precise dimensions The width of flange 16 also is machined to precise dimensions to fit within a housing slot, also described hereinafter. Reduced diameter laminations 22 (FIGS. 1 and 4) simply are provided to allow room for the machining fixture.

It should be noted that heretofore a timing/torque restricting hole conventionally has been formed into the outside diameter or and face of prior art stator cores. With the invention, the timing torque restriction function is accomplished by flange 16 on the stator assembly and the slot in the housing, as described below.

FIGS. 7 and 8 how a housing, generally designated 30, which is precisely machined complementary to the configuration of stator core 10. More particularly, the housing has a closed end 32 and an open end 34. Closed end 32 is provided with a hole or bore 36 for receiving a shaft fixed to the motor rotor open end 34 is provided for simple assembly of the stator assembly and field windings by insertion into the housing in the direction of arrow "A" (FIG. 7).

Housing 30 has a hollow interior cavity or bore 38 which is machined to accommodate the stator assembly and best can be understood in conjunction with FIGS. 9 and 10. Specifically, an open area 40 is provided inside housing end 32 to accommodate motor field windings 28. A precisely machined bore portion 42 is formed for surrounding laminations 12 and 22 (FIG. 1). The bore is enlarged at 44, communicating with open end 34, to define a circumferential shoulder 46 facing outwardly or to the right in FIGS. 7 and 9. This shoulder is designed for abutment against enlarged laminations 14 (18) to prevent axial movement of the stator assembly in one direction relative to the housing, i.e. to the left as viewed in the drawings. Housing 30 further is provided with an interior slot 48 for receiving flange 16 of the stator assembly. The sides 48a (FIG. 8) of slot 48 are precisely machined to provide a minimal gap with the machined sides of flange 16. The interengagement of flange 16 within slot 48 prevents relative rotation between the stator assembly and the housing. Once the stator assembly is fully inserted into position as shown in FIG. 9, a set screw 50, a pin or other readily positionable axial retaining means is located for abutment against the outside face of the stator assembly to prevent axial movement of the stator assembly in the opposite direction, i.e. to the right as viewed in FIG. 9. Sat screw 50 can be threaded through housing 30 by means of a threaded bore 52 (FIG. 7). The set screw can be easily located for abutment against the enlarged portion of laminations 14 which define flange 16. Once in position, the motor rotor (not shown) can be inserted through open end 34 of housing 30 and into bore 26 of the stator assembly, with the shaft of the rotor projecting through the housing, through hole 36 in end wall 32 of the housing.

From the foregoing, it can be seen that the combination of this invention provides an extremely simple system for mounting and locating a stator assembly within a housing for use in a dynamoelectric machine. Simple positioning of the stator assembly in the housing and positioning of set screw 50 is all that is required to mount the stator assembly and achieve its necessary tined relationship. The stator assembly is contained in its singular position and prevented from any radial or axial movement relative to the housing. Because of its simplicity, and the ease of machining, an interference fit of 0.001-0.002 inch can be maintained between the outside diameter of the stator assembly (i.e. laminations 12) and the inner diameter of housing 30 (i.e. machined bore portion 42). In addition, a clearance fit of 0.013-0.018 inch can be maintained between the rotationally confining surfaces 48a (FIG. 8) of slot 48 and the machined sides of flange 16.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a dynamoelectric machine, the combination comprising:
    a stator assembly including a plurality of generally circular laminations bonded together in a generally cylindrical stacked array, a given number of laminations being enlarged in diameter substantially 360° thereabout, and at least some of said given number of laminations being further enlarged in diameter over less than 360° in circumference to define a radially outwardly projecting tab-like flange;
    housing means having a generally cylindrical bore for receiving the stator assembly, shoulder means extending substantially 360° about the bore for axially abutting one side of said given number of laminations of the stator assembly to prevent axial movement of the stator assembly in at least one direction relative to the housing means, and an axially extending slot in the bore for receiving the flange of the stator assembly and preventing the stator assembly from rotating relative to the housing means; and
    readily positionable axial retaining means movably mounted on the housing for radial movement into engagement with the opposite side of the given number of laminations to prevent movement of the stator assembly opposite said one direction.

2. The combination of claim I wherein said shoulder means extends across and defines an inner axial end of said slot for engaging said flange.

3. The combination of claim 2 wherein said axial retaining means extends radially through the housing at a location for engaging the flange.

* * * * *